(12) United States Patent
Zhang et al.

(10) Patent No.: US 8,687,301 B1
(45) Date of Patent: Apr. 1, 2014

(54) PARALLEL NO-SYNC-MARK RETRY

(71) Applicant: LSI Corporation, San Jose, CA (US)

(72) Inventors: Fan Zhang, Milpitas, CA (US); Jun Xiao, Fremont, CA (US); Haitao Xia, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/736,804

(22) Filed: Jan. 8, 2013

(51) Int. Cl.
*G11B 20/10* (2006.01)
(52) U.S. Cl.
USPC .................................................. 360/39
(58) Field of Classification Search
None
See application file for complete search history.

(56) References Cited

U.S. PATENT DOCUMENTS

| | | | | |
|---|---|---|---|---|
| 5,109,385 A | * | 4/1992 | Karp et al. | 360/51 |
| 5,172,381 A | * | 12/1992 | Karp et al. | 360/51 |
| 5,392,129 A | * | 2/1995 | Ohtaka et al. | 360/53 |
| 6,181,497 B1 | * | 1/2001 | Malone, Sr. | 360/51 |
| 6,191,902 B1 | * | 2/2001 | Hashimura et al. | 360/48 |
| 8,049,983 B1 | | 11/2011 | Han et al. | |
| 8,564,897 B1 | * | 10/2013 | Yang et al. | 360/39 |
| 2001/0014054 A1 | * | 8/2001 | Esumi | 365/233 |
| 2011/0205653 A1 | * | 8/2011 | Mathew et al. | 360/31 |
| 2011/0209026 A1 | * | 8/2011 | Xia et al. | 714/752 |
| 2012/0084336 A1 | * | 4/2012 | Yang et al. | 708/323 |

FOREIGN PATENT DOCUMENTS

EP 0 793 843 B1 B1 12/2001

* cited by examiner

*Primary Examiner* — Thang Tran
(74) *Attorney, Agent, or Firm* — Suiter Swantz pc llo

(57) ABSTRACT

The disclosure is directed to detection of a sync mark location for at least one data sector of a disk by processing a first sector and at least a second sector in parallel. A first set of data samples from the first sector is reframed according to one or more sync mark locations based upon a first selected sync mark location, and a second set of data samples from the second sector is reframed according to one or more sync mark locations based upon a second selected sync mark location. The first set of data samples and the second set of data samples are iteratively reframed and decoded until the first sector or the second sector converges or until all possible sync mark locations have been attempted.

20 Claims, 4 Drawing Sheets

PARALLEL NO-SYNC-MARK RETRY

FIELD OF THE INVENTION

The disclosure relates to the field of error correction and data recovery.

BACKGROUND

Storage disks such as, but not limited to, hard disk drives (HDDs) are divided into a plurality of data sectors. According to certain formats, a data sector includes, but is not limited to, a preamble, a sync mark, user data, and end of sector padding. Acquisition of user data using the preamble provides a first level of precision. The sync mark typically provides a higher level of precision than the preamble. As such, failure to detect a sync mark of a data sector can result in failure to successfully recover user data from the sector (i.e. sector failure).

SUMMARY

According to an embodiment of this disclosure, a method of detecting at least one sync mark location of at least one data sector includes processing a first sector and at least a second sector of a plurality of data sectors in parallel. Data samples read from the first sector and the second sector are stored in a buffer. A first set of data samples read from the first sector is framed according to a first selected sync mark location, and a second set of data samples read from the second sector is framed according to a second selected sync mark location. The first set of data samples and the second set of data samples are then decoded to determine whether at least one of the first sector and the second sector converges. If at least one of the sectors converges, a success is declared and the remaining sectors are no longer processed. Otherwise, the first set of data samples is reframed according to at least one additional sync mark location based upon the first selected sync mark location, and the second set of data samples is reframed according to at least one additional sync mark location based upon the second selected sync mark location. The first set of data samples and the second set of data samples are iteratively reframed and decoded until the first sector or the second sector converges or until all possible sync mark locations have been attempted.

It is to be understood that both the foregoing general description and the following detailed description are not necessarily restrictive of the disclosure. The accompanying drawings, which are incorporated in and constitute a part of the specification, illustrate embodiments of the disclosure.

BRIEF DESCRIPTION OF THE DRAWINGS

The embodiments of the disclosure may be better understood by those skilled in the art by reference to the accompanying figures in which.

DETAILED DESCRIPTION

Reference will now be made in detail to the embodiments disclosed, which are illustrated in the accompanying drawings.

Figure 1:
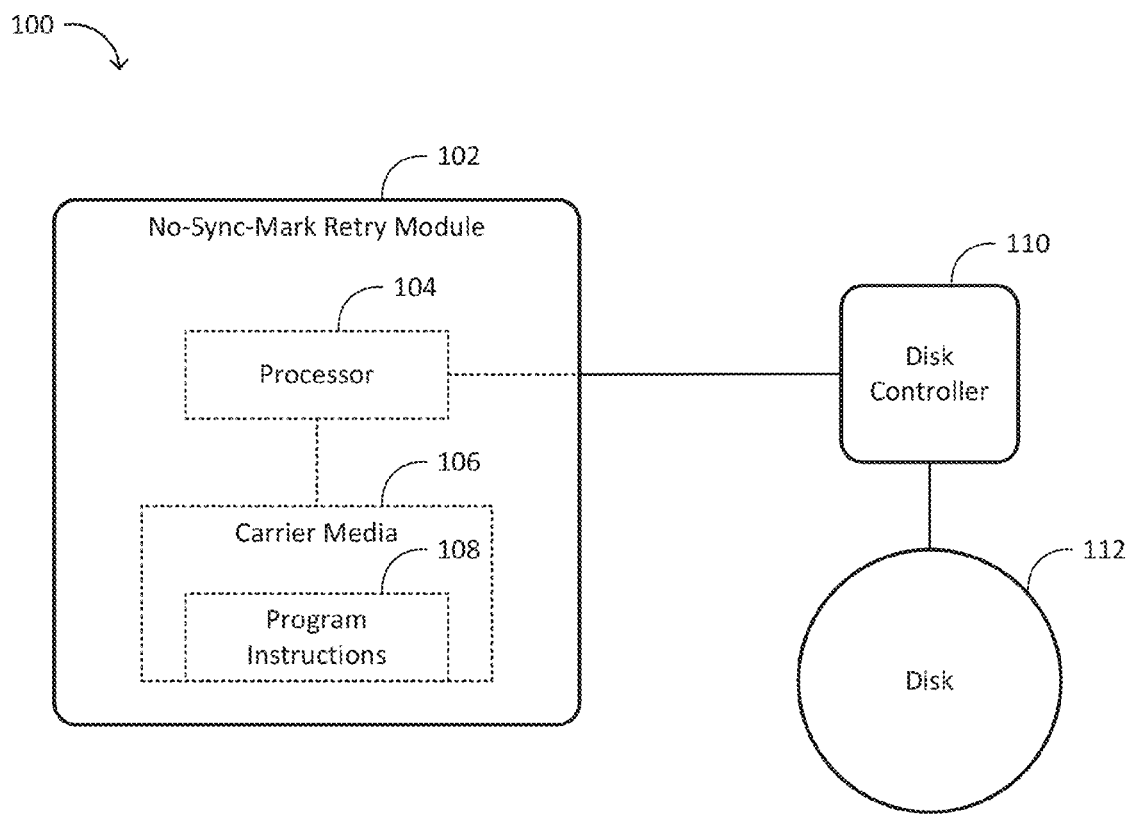
FIG. 1 is a block diagram illustrating a system for detecting at least one sync mark location of at least one data sector of at least one disk, in accordance with an embodiment of the disclosure.
Figure 2A:
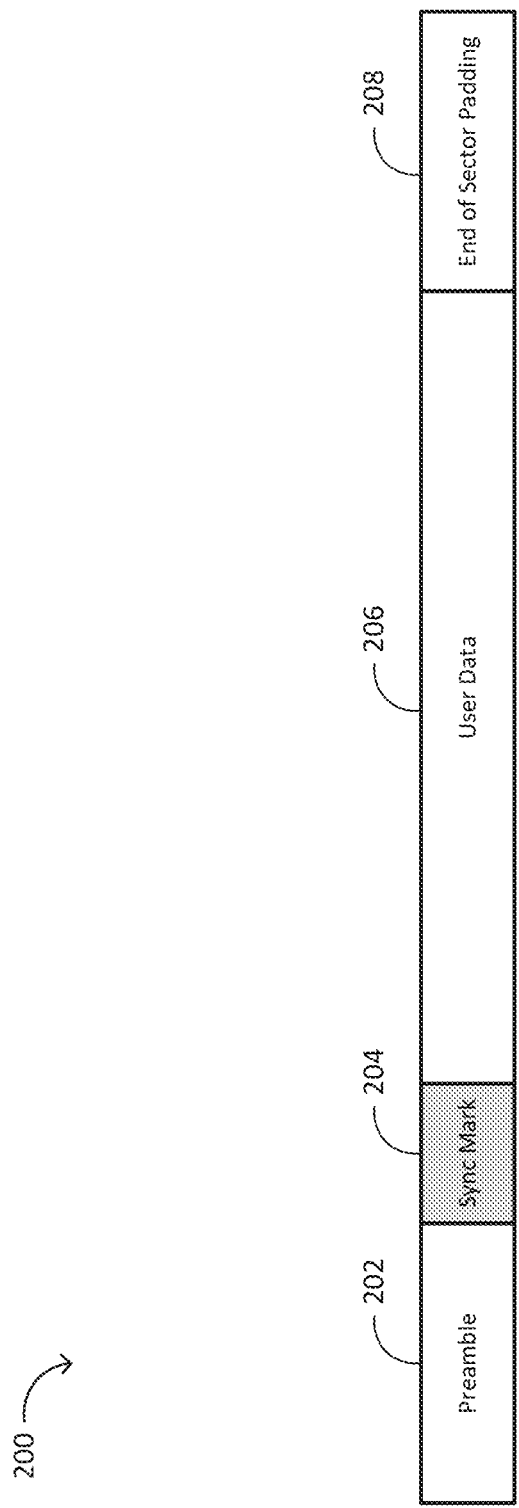
FIG. 2A illustrates a data sector, in accordance with an embodiment of the disclosure.
Figure 2B:
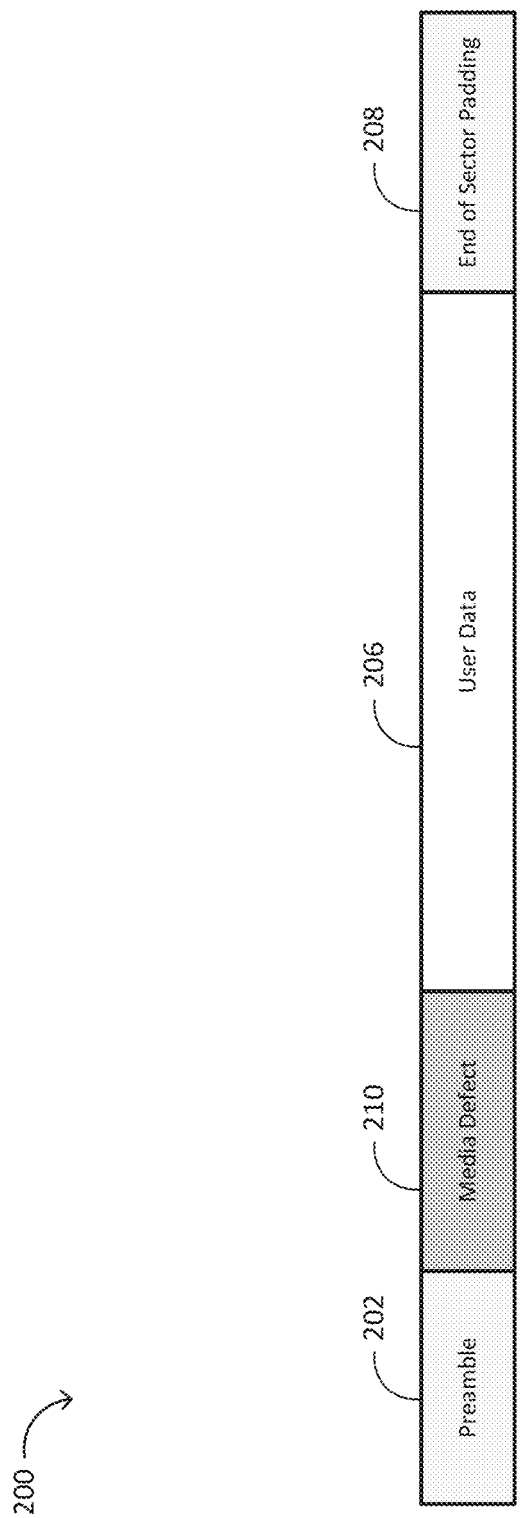
FIG. 2B illustrates the data sector with a media defect that impairs sync mark detection, in accordance with an embodiment of the disclosure.
Figure 3:
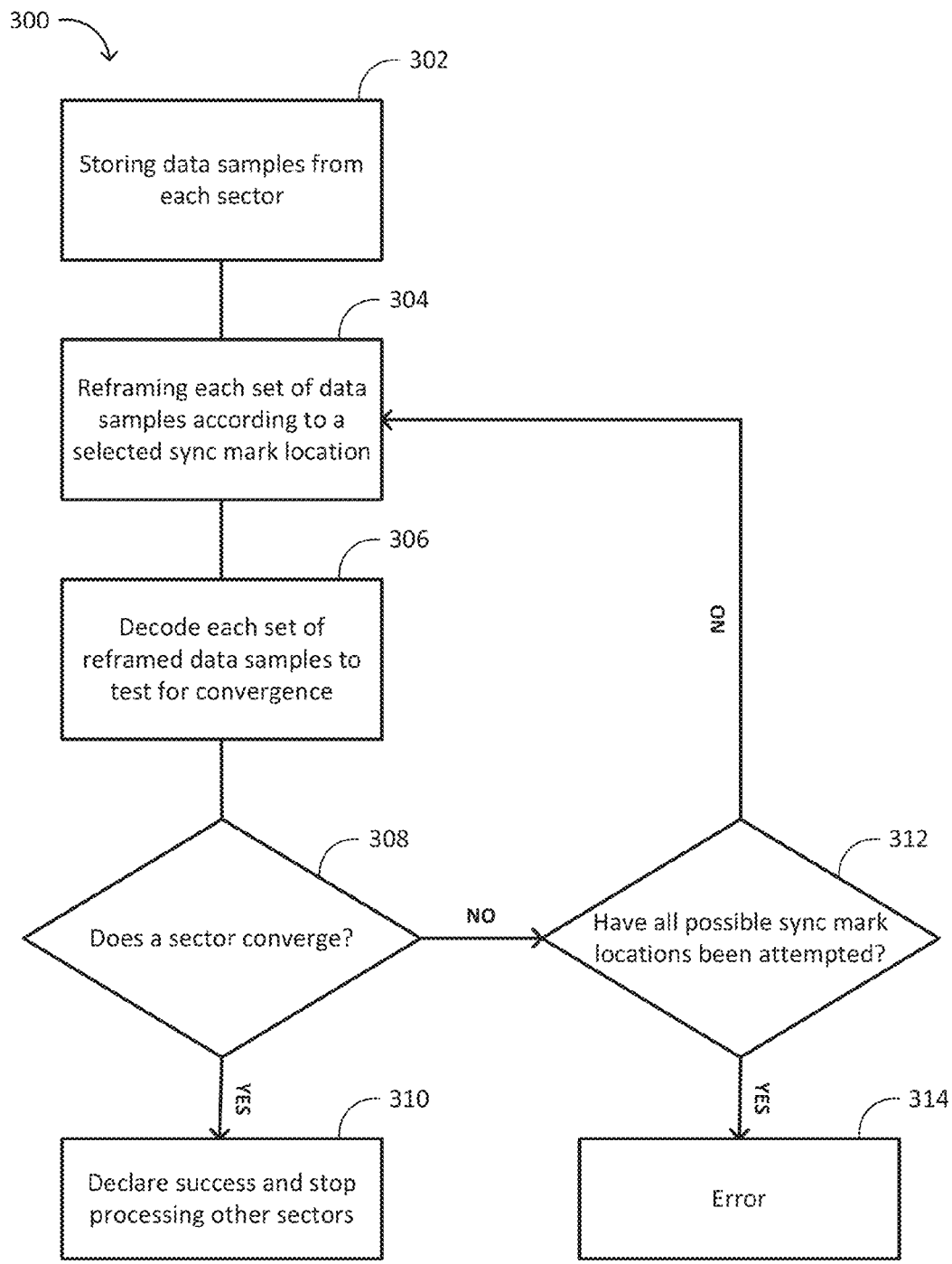
FIG. 3 is a flow diagram illustrating a method of detecting at least one sync mark location of at least one data sector of at least one disk, in accordance with an embodiment of the disclosure.

FIGS. 1 through 3 illustrate embodiments of a system and method for detecting at least one sync mark in one or more fragments of a data sector. In an embodiment, illustrated in FIG. 1, a system 100 for detecting sync marks includes a no-sync-mark retry (NSMR) module 102 in communication with at least one disk 112 and at least one corresponding disk controller 110. The disk 112 includes any optical or magnetic disk known in the art with an associated disk controller 110. In some embodiments, the disk 112 includes a hard disk drive (HDD) and the disk controller 110 includes a HDD controller.

The NSMR module 102 includes hardware, software, firmware, or any combination of the foregoing configured to execute one or more of the steps or functions of the NSMR module 102 described herein. In some embodiments, the NSMR module 102 includes at least one processor 104 configured to execute program instructions 108 from carrier media 106, wherein the program instructions 108 direct the processor 104 to execute or drive additional hardware (e.g. processors, microcontrollers, logic devices) to execute one or more of the steps or functions of the NSMR module 102 described herein.

Each disk 112 includes a plurality of data sectors. FIG. 2A illustrates data sector format, in accordance with various embodiments, in which a data sector 200 includes a preamble 202, a sync mark 204, user data 206, and end of sector padding 208. In some embodiments, the preamble 202 is 128 bits long, the sync mark is 14 or 20 bits long, and the end of sector padding 208 is at least 148 bits long. Data acquisition using the preamble 202 provides a first level of alignment precision (e.g. 4T precision), and acquisition using the sync mark 204 provides a second level of alignment precision (e.g. 1T precision) that is higher than the first level. Failure to detect the sync mark 204 in the data sector 200 or a fragment of the data sector 200 can accordingly result in failure to recover user data. In some cases, illustrated in FIG. 2B, the sync mark 204 is not detected due to a media defect 210 covering at least a portion of the sync mark 204.

In some embodiments, the NSMR module 102 includes at least a portion of a read channel such as, but not limited to, at least a portion of a retry path of the read channel. When a sync mark cannot be detected in a data sector, the NSMR module 102 is configured to signal the disk controller 110 to initiate a retry mode. Accordingly, the disk controller 110 configures the read channel for retry mode, revolves the disk 112, and re-reads the failed (i.e. no sync mark detected) sector to capture raw data samples. The disk controller 110 is further configured to transfer the data samples to the NSMR module 102 for processing.

The NSMR module 102 is configured to process data samples from at least two failed sectors in parallel. Sync mark detection speed across a plurality of sectors is thus improved because delays caused by sequential processing are at least partially alleviated. The parallel processing allows at least two sectors to be searched simultaneously until a sync mark is successfully detected in at least one of the sectors. Thereafter, the processing is terminated for the remaining sectors. Retry mode is re-initiated to process additional sets of failed sectors, which may include remaining sectors from a previous retry.

The parallel processing decreases the likelihood of a failed sector with a very hard or impossible to detect sync mark delaying recovery across a plurality of sectors because at least one additional sector can be simultaneously processed. Furthermore, a sync mark location detected for one sector of a plurality of sectors may correspond to sync mark locations across some or all remaining sectors of the plurality of sectors, thereby allowing detection for one sector to apply across multiple sectors of the plurality of sectors. In some embodiments, the NSMR module 102 is configured to process at least two 4 kilobyte sectors (allowing for approximately 50% faster detection) or up to nine 512 byte sectors (allowing for approximately 89% faster detection) in parallel.

The NSMR module 102 is further configured to return data back to the disk controller 110 after retry is completed with an indication of the recovery status, such as a pass or fail status respectively based on detecting or failing to detect a sync mark. When the data is returned from the NSMR module 102, the disk controller 110 is configured to exit retry mode and return the read channel to a normal mode of operation. While the foregoing embodiments of the system 100 include the NSMR module 102 in a retry path of a read channel, the NSMR module 102 is not limited to the retry path and may include any electronic circuit, computing system, or portion thereof.

FIG. 3 is a flow diagram illustrating an embodiment of a method 300 of detecting at least one sync mark of at least one sector from a plurality of data sectors of a disk 112. System 100 is a manifestation of method 300 and all steps or features described with regard to embodiments of system 100 or method 300 are applicable to both the system 100 and method 300. However, it is noted herein that one or more steps of method 300 may be executed via means known to the art that differ from or modify the foregoing embodiments of system 100. Embodiments of system 100 described herein should not be interpreted to limit method 300 in any way.

At step 302, when retry is initiated, data samples from retry sectors are stored to a buffer. In some embodiments, the retry sectors include at least two failed sectors. The buffer includes any semi-permanent memory accessible for processing such as, but not limited to, random access memory (RAM) or designated buffer memory of a HDD. In some embodiments, retry initiates when all fragments of the retry sectors have been read and raw data samples from each fragment are stored in the buffer. In some embodiments, the NSMR module 102 stores data samples from at least a first sector and a second sector for parallel NSMR processing.

In some embodiments, a selected number of fragments with undetected sync marks are simultaneously processed. In some embodiments, the NSMR module 102 is configured to accommodate up to two no-sync-mark (NSM) fragments per sector. The retry is aborted if more than the selected number of NSM fragments (e.g. more than two NSM fragments) are detected for one sector. The data is then returned to the disk controller 110 with a sector fail status and an indication that the failure was the result of too many NSM fragments, as opposed to a non-convergence error (see step 314 below). In some embodiments, forced sync marks are used to enable processing more than the selected number of NSM fragments (e.g. two fragments with forced sync marks and two NSM fragments).

At step 304, the data samples from each sector fragment are reframed according to selected sync mark locations. In some embodiments, data samples from a first sector or fragment of the first sector are reframed according to a first selected sync mark location, and data samples from at least a second sector or fragment of the second sector are reframed according to a second selected sync mark location. In some embodiments, the selected starting sync mark locations are central locations within a search window (e.g. starting sync mark location=w/2, where w defines the search window). In other embodiments, the starting sync mark locations are selected based on historical sync mark locations, such as locations having high occurrence rates in previous retries. In some embodiments, the search window is a selected value (e.g. 128 bits) for each fragment. In other embodiments, the search window is limited by firmware or system performance selections or specifications.

At steps 306 and 308, each set of reframed data samples is decoded to test whether any of the retry sectors converge to a valid code word. If at least one of the retry sectors converges, the method proceeds to step 310. At step 310, the sync mark location associated with the converging sector is selected and processing is terminated for the remaining non-converging sectors. The converging sector data is returned to the disk controller 112 with an indication of success. In some embodiments, the disk controller 112 executes an error detection and correction (EDC) check. If the EDC check fails because the sector converged to an incorrect code word or another error, the disk controller 112 reinitiates or resumes retry. Otherwise, the disk controller 112 terminates retry and returns to normal operation. In some embodiments, the NSMR module holds the data samples and sync mark search position during the EDC check so that retry can be resumed from the current search position.

If none of the retry sectors converge at step 308, the method proceeds to step 312 and checks whether all possible sync mark locations have been attempted. If all possible sync mark locations from the search window have not been exhausted, the method returns to step 304 and the NSMR module 102 reframes each set of data samples according to new sync mark locations. In some embodiments, the data samples are reframed according to iteratively chosen sync mark locations based upon the starting sync mark locations. In some embodiments, the search window is iterated from the starting sync mark location with 1T granularity. In other embodiments, starting sync mark locations and succeeding sync mark locations are both based upon historical values, such as an ordering of sync mark locations from previous retries. In some embodiments, the sync mark locations within a search window are attempted in order from highest occurrence rates to lowest occurrence rates.

The retry loop resumes until at least one of the sectors converges or until all of the possible sync mark locations have been attempted. If all of the possible sync mark locations are exhausted without success, the method proceeds to step 314 and data is returned to the disk controller 110 with an error message indicating failure to locate a sync mark location resulting in sector convergence. In some embodiments, the retry loop is limited to a selected number of attempts rather than requiring full exhaustion of the selected search window.

It should be recognized that in some embodiments the various steps or functions described throughout the disclosure may be carried out by a single computing system or multiple computing systems. A computing system may include, but is not limited to, a personal computing system, mainframe computing system, workstation, image computer, parallel processor, or any other device known in the art. In general, the term "computing system" is broadly defined to encompass any device having one or more processors, which execute instructions from a memory medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a storage medium such as, but not limited to, a read-only memory, a random access memory, a magnetic or optical disk, or a magnetic tape.

Embodiments manifesting methods described herein may include storing results in a storage medium. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A system for detecting at least one sync mark location of at least one data sector, comprising a no-sync-mark retry module in communication with a disk including a plurality of data sectors, the no-sync-mark retry module having a processor configured to determine at least one sync mark location for at least one sector of the plurality of data sectors by processing a first sector and at least a second sector of the plurality of data sectors in parallel, the processing including:
   storing data samples read from the first sector and the second sector;
   framing a first set of data samples read from the first sector according to a first selected sync mark location and a second set of data samples read from the second sector according to a second selected sync mark location;
   decoding the first set of data samples and the second set of data samples to determine whether at least one of the first sector and the second sector converges; and
   reframing the first set of data samples according to at least one additional sync mark location based upon the first selected sync mark location and the second set of data samples according to at least one additional sync mark location based upon the second selected sync mark location, until at least one of the first sector and the second sector converges or until all possible sync mark locations have been attempted.

2. The system of claim 1, wherein the no-sync-mark retry module is configured to process not less than two and not more than nine sectors in parallel.

3. The system of claim 2, wherein the no-sync-mark retry module is configured to process two 4-kilobyte sectors in parallel.

4. The system of claim 2, wherein the no-sync-mark retry module is configured to process nine 512-byte sectors in parallel.

5. The system of claim 1, wherein the no-sync-mark retry module is further configured to declare a success when at least one of the processed sectors converges and discontinue processing any non-convergent sectors.

6. The system of claim 1, wherein the possible sync mark locations are defined by a selected search window per processed fragment of each processed sector.

7. The system of claim 6, wherein the no-sync-mark retry module is configured to process no more than two fragments of each processed sector.

8. The system of claim 6, wherein the selected search window includes 128 bits per processed fragment.

9. The system of claim 6, wherein the no-sync-mark retry module is configured to iterate outwards from the center of the selected search window for each processed fragment of each processed sector.

10. The system of claim 6, wherein the no-sync-mark retry module is configured to iterate outwards from a selected location of the selected search window for each processed fragment of each processed sector, the selected location determined utilizing previously detected sync mark locations.

11. A method of detecting at least one sync mark location of at least one data sector, comprising:
   storing data samples read from a first sector and a second sector of a plurality of data sectors of a disk;
   framing a first set of data samples read from the first sector according to a first selected sync mark location and a second set of data samples read from the second sector according to a second selected sync mark location;
   decoding the first set of data samples and the second set of data samples in parallel to determine whether at least one of the first sector and the second sector converges; and
   reframing the first set of data samples according to at least one additional sync mark location based upon the first selected sync mark location and the second set of data samples according to at least one additional sync mark location based upon the second selected sync mark location, until at least one of the first sector and the second sector converges or until all possible sync mark locations have been attempted.

12. The method of claim 11, wherein not less than two and not more than nine sectors are processed in parallel.

13. The method of claim 12, wherein two 4-kilobyte sectors are processed in parallel.

14. The method of claim 12, nine 512-byte sectors are processed in parallel.

15. The method of claim 11, further comprising:
   declaring a success when at least one of the processed sectors converges and discontinuing the processing of any non-convergent sectors.

16. A method of detecting at least one sync mark location of at least one data sector, comprising:
   storing data samples read from a first sector and a second sector of a plurality of data sectors of a disk;
   framing a first set of data samples read from at least one fragment of the first sector according to a first selected sync mark location and a second set of data samples read from at least one fragment of the second sector according to a second selected sync mark location;
   decoding the first set of data samples and the second set of data samples in parallel to determine whether at least one of the first sector and the second sector converges; and
   reframing the first set of data samples according to at least one additional sync mark location based upon the first selected sync mark location and the second set of data samples according to at least one additional sync mark location based upon the second selected sync mark location, until at least one of the first sector and the second sector converges or until all possible sync mark locations defined by a selected search window have been attempted.

17. The method of claim 16, wherein no more than two fragments of each sector are processed in parallel.

18. The method of claim 16, wherein the selected search window includes 128 bits per processed fragment.

19. The method of claim 16, wherein additional sync mark locations are selected by iterating outwards from the center of the selected search window for each processed fragment of each processed sector.

20. The method of claim 16, wherein additional sync mark locations are selected by iterating outwards from a selected location of the selected search window for each processed fragment of each processed sector, and the selected location is determined utilizing previously detected sync mark locations.

* * * * *